(12) United States Patent
Iverson

(10) Patent No.: US 7,383,238 B1
(45) Date of Patent: Jun. 3, 2008

(54) INDUCTIVE MONITORING SYSTEM CONSTRUCTED FROM NOMINAL SYSTEM DATA AND ITS USE IN REAL-TIME SYSTEM MONITORING

(75) Inventor: David L. Iverson, Sunnyvale, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 382 days.

(21) Appl. No.: 10/789,029

(22) Filed: Feb. 24, 2004

(51) Int. Cl.
*G06N 5/00* (2006.01)

(52) U.S. Cl. .......... 706/25; 382/224; 700/83; 715/503; 715/804

(58) Field of Classification Search ........ 706/25, 706/20; 382/157, 224; 194/317; 700/83; 715/503, 804
See application file for complete search history.

(56) References Cited

U.S. PATENT DOCUMENTS

| | | | |
|---|---|---|---|
| 5,262,943 A | 11/1993 | Thibado et al. ........ 364/413.01 |
| 5,267,139 A | 11/1993 | Johnson ....................... 364/148 |
| 5,444,796 A * | 8/1995 | Ornstein ....................... 382/157 |
| 5,485,908 A * | 1/1996 | Wang et al. .................. 194/317 |
| 5,544,281 A | 8/1996 | Maruoka et al. .............. 395/68 |
| 5,563,983 A | 10/1996 | Nozaki et al. ................. 395/23 |
| 5,590,218 A * | 12/1996 | Ornstein ...................... 382/157 |
| 5,625,751 A * | 4/1997 | Brandwajn et al. ........... 706/20 |
| 5,640,549 A | 6/1997 | Powsner et al. ............. 364/578 |
| 5,672,154 A | 9/1997 | Sillén et al. ................... 604/50 |
| 5,715,451 A | 2/1998 | Marlin ........................ 395/615 |
| 5,742,811 A | 4/1998 | Agrawal et al. ............ 395/606 |
| 5,749,365 A | 5/1998 | Magill ......................... 128/671 |
| 6,006,163 A | 12/1999 | Lichtenwalner et al. ...... 702/36 |
| 6,064,770 A | 5/2000 | Scarth et al. ................ 382/225 |
| 6,108,004 A * | 8/2000 | Medl .......................... 715/804 |
| 6,157,935 A * | 12/2000 | Tran et al. .................... 715/503 |
| 6,216,066 B1 | 4/2001 | Goebel et al. ................ 701/29 |
| 6,226,408 B1 * | 5/2001 | Sirosh ........................ 382/224 |
| 6,292,797 B1 | 9/2001 | Tuzhilin et al. ................ 707/6 |
| 6,317,700 B1 | 11/2001 | Bagne ......................... 702/181 |
| 6,330,499 B1 | 12/2001 | Chou et al. .................... 701/33 |

(Continued)

FOREIGN PATENT DOCUMENTS

| | | |
|---|---|---|
| WO | WO 97/22297 | 6/1997 |
| WO | WO 01/78577 | 10/2001 |
| WO | WO 01/97909 | 12/2001 |
| WO | WO 03/043494 | 5/2003 |
| WO | WO 03/057011 | 7/2003 |

*Primary Examiner*—Wilbert L Starks, Jr.
(74) *Attorney, Agent, or Firm*—John F. Schipper; Robert M. Padilla

(57) ABSTRACT

The present invention relates to an Inductive Monitoring System (IMS), its software implementations, hardware embodiments and applications. Training data is received, typically nominal system data acquired from sensors in normally operating systems or from detailed system simulations. The training data is formed into vectors that are used to generate a knowledge database having clusters of nominal operating regions therein. IMS monitors a system's performance or health by comparing cluster parameters in the knowledge database with incoming sensor data from a monitored-system formed into vectors. Nominal performance is concluded when a monitored-system vector is determined to lie within a nominal operating region cluster or lies sufficiently close to a such a cluster as determined by a threshold value and a distance metric. Some embodiments of IMS include cluster indexing and retrieval methods that increase the execution speed of IMS.

14 Claims, 10 Drawing Sheets

U.S. PATENT DOCUMENTS

| | | | |
|---|---|---|---|
| 6,336,109 B2 | 1/2002 | Howard | 706/25 |
| 6,393,387 B1 | 5/2002 | Adriaans et al. | 703/27 |
| 6,400,996 B1 * | 6/2002 | Hoffberg et al. | 700/83 |
| 6,446,027 B1 | 9/2002 | O'Keeffe et al. | 702/183 |
| 6,490,527 B1 | 12/2002 | Utt | 702/9 |
| 6,581,058 B1 | 6/2003 | Fayyad et al. | 707/6 |
| 6,599,250 B2 | 7/2003 | Webb et al. | 600/483 |
| 6,602,469 B1 | 8/2003 | Maus et al. | 422/68.1 |

\* cited by examiner

| | Pressure A | Valve 1 Position | Pressure B | Valve 2 Position | Pressure C | Temperature 1 | Temperature 2 |
|---|---|---|---|---|---|---|---|
| | 2857.2 | 86.4% | 1218.4 | 96.2% | 1104.1 | 49.8 | 37.6 |

Fig. 3

| | Pressure A | Valve 1 Position | Pressure B | Valve 2 Position | Pressure C | Temperature 1 | Temperature 2 |
|---|---|---|---|---|---|---|---|
| High | 2857.6 | 86.8% | 1219.2 | 96.3% | 1105.0 | 50.1 | 38.2 |
| Low | 2855.8 | 86.2% | 1215.7 | 95.5% | 1103.2 | 49.6 | 37.5 |

Fig. 5

| POV-4 | PCV-6 | PIT3 | PT6 | PIT3-PT6 | PIT3 | PT6 |
|---|---|---|---|---|---|---|
| position | position | pressure | pressure | difference | change | change |

INDUCTIVE MONITORING SYSTEM CONSTRUCTED FROM NOMINAL SYSTEM DATA AND ITS USE IN REAL-TIME SYSTEM MONITORING

ORIGIN OF INVENTION

The invention described herein was made by an employee of the United States Government and may be manufactured and used by or for the Government for governmental purposes without payment of any royalties thereon or therefor.

BACKGROUND OF INVENTION

1. Technical Field of the Invention

This invention relates generally to the field of automated system monitoring and anomaly detection and, in particular, to methods of generating system monitoring knowledge bases from nominal system behavior, and to the use of these knowledge bases in monitoring system performance in real-time or near-real-time.

2. Description of the Prior Art

The modern information age provides great quantities of raw data concerning the performance of man-made engineered systems as well as data concerning the behavior of natural systems. Numerous information processing techniques have been employed to attempt to classify such data, look for anomalies, or otherwise assist humans to extract, understand and/or respond to information contained in the data. Examples of such techniques include model based reasoning, machine learning, neural networks, data mining, support vector machines, various decision tree models including ID3 decision tree learner, among many others. However, these techniques typically have one or more drawbacks that render them unsuitable or disfavored for some applications.

For example, model based reasoning and related techniques typically require a detailed engineering simulation of the system under study, often including expert knowledge of system behavior, detailed behavior of system components and subsystems, detailed knowledge of interaction among system components and failure mechanisms, among other knowledge. Such knowledge may not be available for all components and subsystems. Furthermore, even when a reasonably accurate system simulation is available, it often requires impractical amounts of computer resources. That is, the simulation may execute too slowly to provide information in real-time or near-real time so as to be unsuitable for many practical system monitoring applications. In addition, the computer resources may not be available in space-limited or weight-limited environments such as space vehicles. Thus, a need exists in the art for computationally rapid techniques to monitor the performance of a system and detect anomalous behavior without the need for excessive computer resources.

Some classification or decision models require that the system be trained with data that includes data derived from both normally-functioning systems (nominal data) as well as data derived from anomalous system behavior (off-nominal data). In many practical applications, off-nominal data is unavailable for training, and even the nominal data available for training may not fully explore all of the system's nominal operating regimes. Thus, a further need exists in the art for techniques to monitor a system's performance that does not require off-nominal data for training.

SUMMARY OF THE INVENTION

Accordingly and advantageously, the present invention relates to an Inductive Monitoring System (IMS), its software implementations and applications. IMS builds one or more system monitoring knowledge bases that are subsequently used to monitor system performance. IMS analyzes nominal system data and forms classes or clusters of expected system sensor values. These clusters are used in building a system monitoring knowledge base. IMS system monitoring knowledge bases can be constructed entirely from several sets of nominal sensor data, either gathered directly from the sensors of the system to be monitored during actual operation, or gathered from system simulations, or both. Thus, among the advantages of IMS is that off-nominal data is not needed to train IMS. Further advantages of IMS include avoiding the complexity and expense of constructing a detailed system model that may require many hours of expert time to create and/or significant computer resources to run.

IMS monitors a system by comparing incoming sensor data with the clusters in the knowledge base to determine a "distance" (defined according to a suitable metric) from the incoming sensor data to the nearest knowledge base cluster. If the incoming sensor data lies sufficiently close to a cluster of the knowledge base derived from nominal system performance, the system is deemed to be functioning normally since it is sufficiently close to previous normal behavior. "Sufficiently close" is determined by threshold parameters supplied by the user to take into account that training data will not generally span the entire space of normal system operation, and the sensor data from nominally operating systems is inherently subject to a level of "noise," causing deviations in data received from sensors even for identically-operating systems.

An important function of IMS is to monitor system performance (or the "health" of the system) in order to detect off-nominal performance, and not necessarily to provide thorough system diagnostics. However, limited diagnostic information may be available with IMS and can provide useful diagnostic information in some circumstances. For example, the amount by which off-nominal data fails to meet the threshold criteria (that is, the "distance" from the nearest cluster) can provide information as to the severity of the anomalous performance. In addition, the particular cluster closest to the suspicious system data can also provide useful guidance as to the possible nature of the anomalous performance (and/or exclude certain types of system malfunctions).

Some embodiments of IMS include cluster indexing and retrieval methods that are shown to be advantageous for increasing the execution speed of IMS. Distances are determined from the clusters of the knowledge database to one or more reference points. The clusters are sorted into a list according to these distance values, typically in ascending order of distance. When a set of input data arrives and is to be tested, such input data is arranged as an ordered set of numbers, or an input vector. The distance from the input vector to the reference point(s) is then computed. The search of clusters from the list can be limited to those clusters lying within a certain distance range from the input vector, thereby increasing the system monitoring speed.

These and other advantages are achieved in accordance with various embodiments of the present invention as described in detail below.

BRIEF DESCRIPTION OF THE DRAWINGS

To facilitate understanding, identical reference numerals have been used, where possible, to designate identical elements that are common to the figures.

The techniques of the present invention can readily be understood by considering the following detailed description in conjunction with the accompanying drawings, in which:

FIG. 3 depicts an exemplary data vector as used by the inductive monitoring system of FIG. 1.

FIG. 5 depicts an exemplary cluster having a pair of data vectors showing maximum and minimum values for the parameters.

DETAILED DESCRIPTION OF THE INVENTION

After considering the following description, those skilled in the art will clearly realize that the teachings of the invention can be readily utilized for monitoring the performance of systems, or system health, in real-time or near-real-time.

The Inductive Monitoring System (IMS), in its various embodiments and implementations, is used to build or generate one or more "system monitoring knowledge bases or databases" also referred to as "knowledge bases or databases" or "cluster database(s)" without distinction. The system monitoring knowledge bases can be generated from either actual sensor data gathered during system runs and typically stored as archival data, or from "pseudo-sensor data" generated by system simulations (if available), or a combination of both actual and simulated sensor data. IMS typically generates the monitoring knowledge bases from "nominal" system runs or simulations, that is from runs or simulations that exhibit normal performance without anomalous behavior. This is in contrast to many fault-detection or system health monitoring procedures in which anomalous or "off-nominal" system behavior is required.

Another important objective of IMS is to provide techniques to automatically produce system monitoring knowledge bases for systems that are either difficult to model (simulate) or which require computer models that are too complex for use in real-time or near-real-time monitoring. IMS uses nominal data sets collected either directly from the system or from detailed simulations of the system to build a knowledge base that can then be used to detect anomalous behavior in the system. IMS "learns" typical system behavior by extracting general classes of nominal data from archived data sets and is thereby able to monitor the system by comparing real-time operational data with these classes in the knowledge base.

Figure 1:
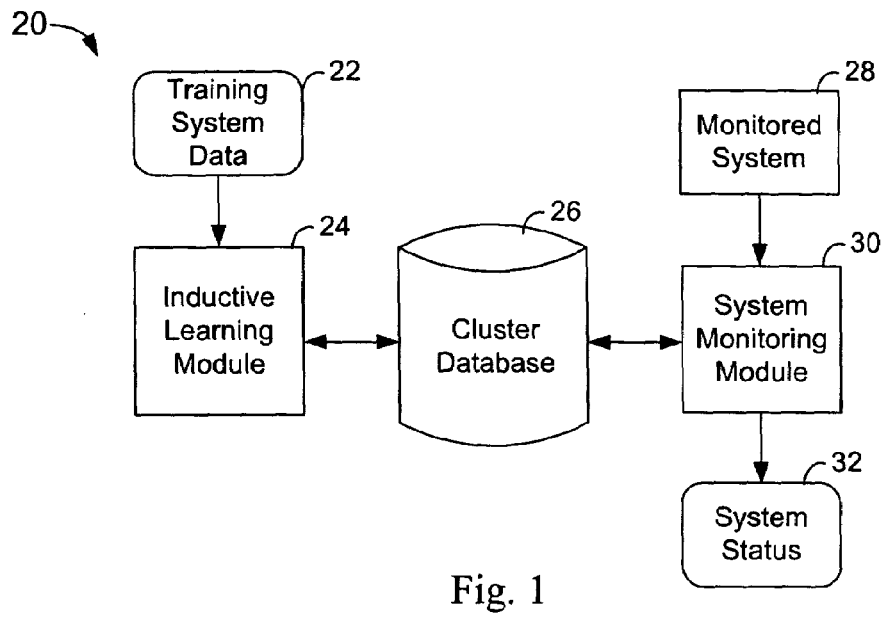
FIG. 1 depicts a high-level block diagram of a typical embodiment of the inductive monitoring system.

FIG. 1 depicts a high-level block diagram of a typical implementation of IMS 20. Some embodiments of IMS can be summarized as follows, with reference to FIG. 1: A set of training data 22 is obtained from actual system sensors or simulated system performance. Nominal operating regions (or "clusters") are extracted from the training data by IMS, typically operating through an inductive learning module 24, and stored in a system monitoring knowledge base, or cluster database 26. As data is acquired from sensors on an actual, operating, system, that is, monitored system data, 28, a system monitoring module 30 of IMS compares the data acquired from monitored system 28 with the clusters of the cluster database 26 to determine the monitored system's performance or status 32. Thus, IMS learns system behavior and stores that knowledge in a database, which is compared with data from actual operating systems to monitor that system's performance or "health."

Figure 2:
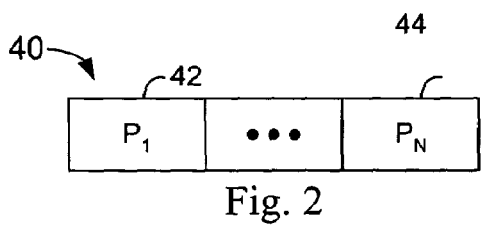
FIG. 2 depicts a diagram of a typical data vector used by the inductive monitoring system of FIG. 1.

FIG. 2 depicts a vector 40 or data vector. The data vector 40 is the basic data structure of the IMS and comprises a set of N parameter values, $P_1$ 42 to $P_N$ 44. Each vector 40 is an ordered list of data parameters 42-44 (also referred to as vector elements or members). The data parameter values 42-44 are collected from the training system or the monitored system by a data acquisition process, or produced by means of a system simulation. In another embodiment, the vectors 40 can contain derived parameter values computed from the collected data parameter values and/or parameter values derived from data acquired at different times (from different data "frames"). The values used in a given data vector may be collected simultaneously by the data acquisition system, or collected over a period of time. The user specifies the size and contents of the vector structure appropriate for the monitoring application.

FIG. 3 depicts an exemplary data vector 50. The name of each data parameter is shown above its value. For example, data parameter 52, Pressure A, has a value of 2857.2. The names of the other data parameters are Valve 1 Position 54, Pressure B 56, Valve 2 Position 58, Pressure C 60, Temperature 1 62 and Temperature 2 64.

IMS is advantageously used for those cases in which it is particularly difficult to construct detailed system diagnostic models of the system (or some components thereof) due to the complexity or unavailability of design information. IMS system monitoring knowledge bases, or cluster databases, can be constructed entirely from several sets of nominal sensor data, either gathered directly from the sensors of the system to be monitored during actual operation, or gathered from system simulations, or both. IMS analyzes the nominal system data and forms classes, or clusters, of expected system sensor values. These classes are used to build a system monitoring knowledge base. Data used to construct classes of expected sensor values and the system knowledge database are called "training data" whether obtained from actual system operation, simulations or both.

Figure 4:
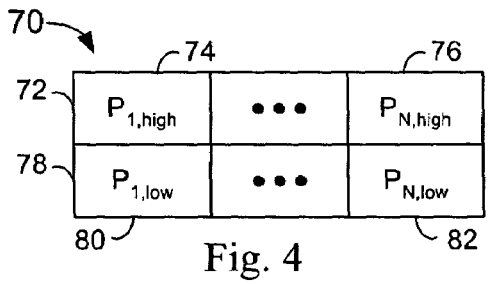
FIG. 4 depicts a diagram of a typical cluster of the cluster database of FIG. 1.

FIG. 4 depicts a typical cluster 70. IMS "learns" the operating characteristics of the system by processing training data sets containing nominal system data collected either from the monitored system itself or from an accurate simulation of the system, or both. IMS processes the training data by formatting the data into the predefined vector format and building a knowledge base containing clusters of related value ranges for the vector parameters. In some embodiments of the present invention, each cluster defines a range of allowable values for each parameter in a given vector.

In cluster 70, a first cluster vector 72 comprises the values of the upper limit, that is, a high value, for the parameters, $P_{1,high}$ to $P_{N,high}$, 74 to 76, respectively; and a second cluster vector 78 comprises the lower limit, that is, a low value, for the parameters $P_{1,low}$ to $P_{N,low}$, 80 to 82, respectively. In one embodiment, a cluster defines a range of values for a subset of the parameters of a vector. Alternately, a cluster defines a range of values for each parameter of a vector.

During system monitoring, the parameter values collected from the monitored system for a given vector are compared to the values of the clusters in the cluster database. If the clusters were generated from nominal data and if all the values of a vector from the monitored system fall within or near the parameter ranges defined by one of these clusters, that vector is deemed to contain nominal data.

FIG. 5 depicts an exemplary cluster 90 for the parameters of the vector of FIG. 3. The name of each parameter is shown above the values. The first cluster vector 92 comprises the high values or upper limits for respective parameters. The second cluster vector 94 comprises the low values or lower limits for respective parameters.

Each data vector can be considered a point in N-dimensional space where N is the number of parameters in the vector. As described above, a cluster defines an interval, that is, a range of possible values for the parameters in a vector. A vector representing a point contained in a cluster will contain a value for each parameter within the range specified in the cluster for the corresponding parameter. The high and low values for each parameter in the vectors in a cluster can be thought of as points that define the corners of an N-dimensional "minimum bounding rectangle." All points contained in a cluster will thus be contained inside or on an edge of that rectangle. FIG. 5 depicts an exemplary cluster showing minimum and maximum parameter values for the parameters of the vector of FIG. 3.

Figure 6:
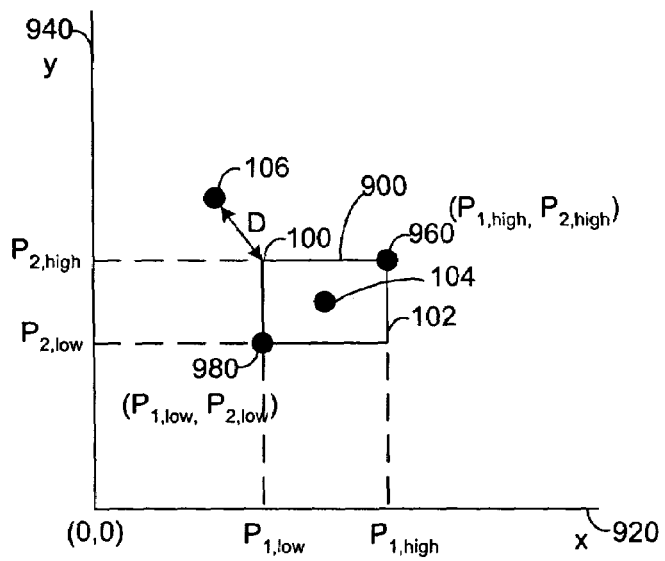
FIG. 6 depicts an example of a two-dimensional minimum bounding rectangle for an exemplary cluster.

FIG. 6 depicts an example of a two-dimensional minimum bounding rectangle 900 for an exemplary cluster. The cluster has two parameters, first and second parameters, $P_1$ and $P_2$, respectively. The first parameter $P_1$ is plotted on the x-axis 920. The second parameter $P_2$ is plotted on the y-axis 940. A first cluster vector, that defines the upper limits, contains parameter values ($P_{1,high}$, $P_{2,high}$) and forms an upper corner 960 of the minimum bounding rectangle 900. A second cluster vector, that defines the lower limits, contains parameter values ($P_{1,low}$, $P_{2,low}$) and forms a lower corner 980 of the minimum bounding rectangle 90. The other corners, 100 and 102, of the minimum bounding rectangle 900 are defined by the ($P_{1,low}$, $P_{2,high}$) and ($P_{1,high}$, $P_{2,low}$), respectively.

Figure 7:
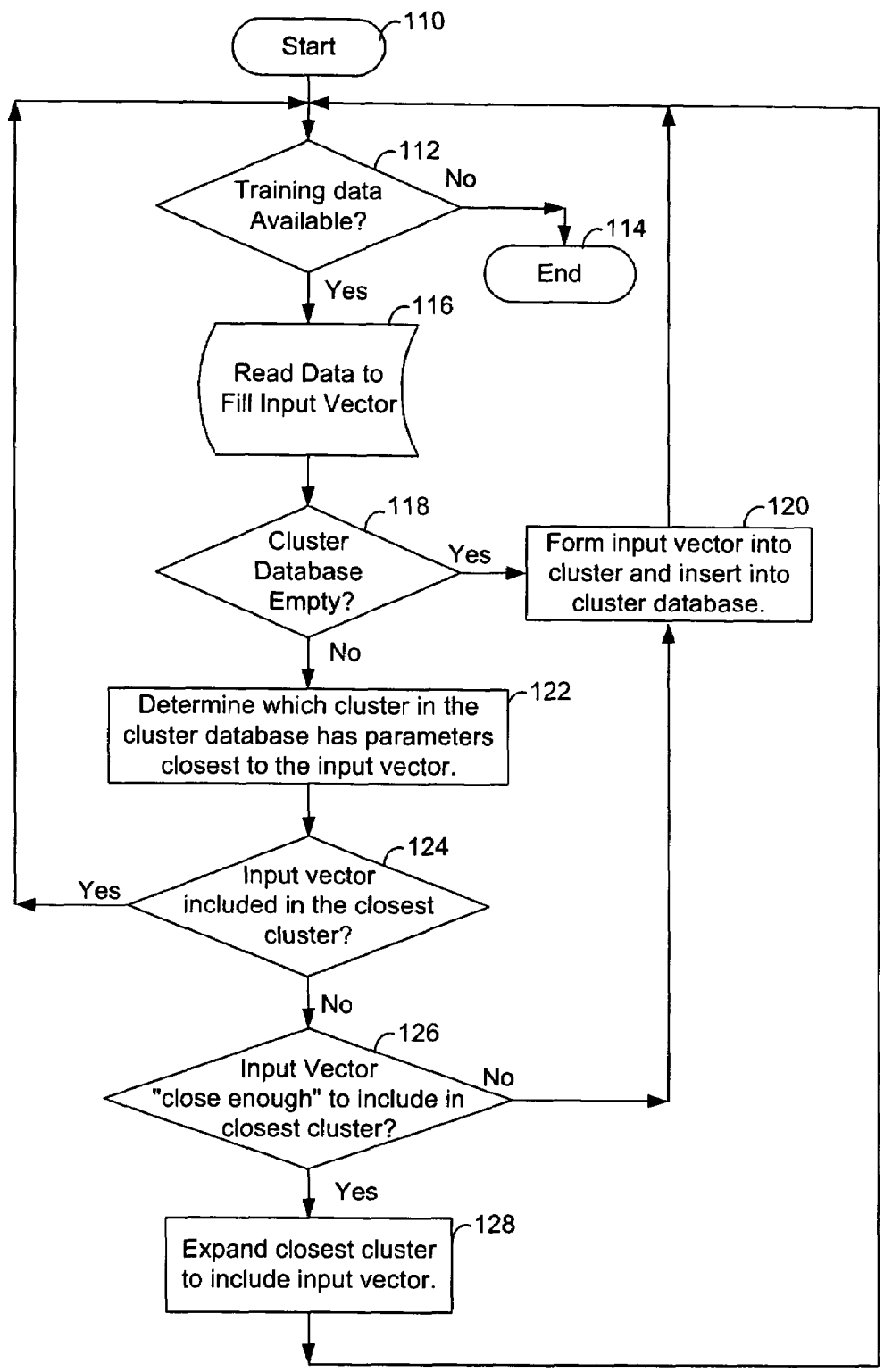
FIG. 7 depicts a flowchart of an embodiment of a technique to generate a cluster database by the inductive learning module of FIG. 1.

FIG. 7 depicts a flowchart of an embodiment of the generation of a cluster database by the inductive learning module 24 of FIG. 1. In step 110, the inductive learning module typically begins the training process with an empty cluster database. In step 112, the inductive learning module determines if any training data is available. If not, in step 114, the process ends. If, in step 112, the inductive learning module determines that training data is available, in step 116, the inductive learning module reads the training data and formats the training data into an input vector. Alternately the inductive learning module receives real-time training data. In step 118, the inductive learning module determines if the cluster database is empty. If so, in step 120, the inductive learning module forms a cluster based on the values of the input vector, inserts the cluster into the cluster database, and proceeds to step 112. In one embodiment, to form the cluster, the inductive learning module adds predetermined high initialization values to respective parameter values of the input vector to form a high value for each parameter of the cluster, and subtracts predetermined low initialization values from respective parameters of the input vector to form a low value for each parameter of the cluster. When a new cluster is formed from a single input vector, it is frequently advantageous to expand the parameter values of the input vector to accommodate for data uncertainty and/or to provide for a more general initial cluster definition.

If, in step 118, the inductive learning module determines that the cluster database is not empty, in step 122, the inductive learning module determines which cluster in the cluster database has parameter values closest to the input vector. "Closest" is defined in terms of a defined "distance" between the input vector and the cluster. To determine the distance, a variety of definitions for a distance metric can be used. In one embodiment, the standard Euclidean distance metric determines a distance D between the input vector and a selected point in the cluster as follows in Eq. 1:

$$D(X, Y) = \sqrt{\sum_i [X_i - Y_i]^2} \qquad \text{Eq. 1}$$

In which the summation is over all N parameters in each vector X and Y.

The distance metric, whether defined by Eq. 1 or an alternative, typically determines the distance between two vectors or points in the N dimensional space. Since a cluster will generally contain more than one vector, determining the distance from a vector to a cluster involves generalizing the application of a distance metric to accommodate a multi-vector cluster. Several procedures can be used. A cluster reference point within the cluster can be selected and all "distances to the cluster" defined to be the distance to the cluster reference point. A centroid value can be computed for each parameter of the vectors in the cluster and this centroid point used as the cluster reference point. Other weighted averages of the parameter values or mean parameter values of each vector in the cluster can also be used to determine a cluster reference point. Specific examples are described below.

The concept of "distance to a cluster" is not restricted to the use of a single cluster reference point with "distance" determined according to a distance metric from the input vector to the reference point. The goal of such a calculation is to provide a quantitative measure of "nearness" of the input vector to various clusters in the database such that, in generating the cluster database, the input vector can be assigned to an existing cluster or used to initiate another cluster. For system monitoring, the "nearness" definition should be capable of distinguishing normal from anomalous system behavior. These criteria can be fulfilled by a "distance" concept involving several vectors of the cluster as well as the use of a "distance" to a single exemplary cluster reference point. For example, in some embodiments of the present invention, the parameter values of the input vector are compared to the upper and lower parameter values of the vectors of the cluster and the differences are summed (in some embodiments, taking account of algebraic signs of the differences to account for input vectors lying within a previously-determined cluster). Such a multi-vector "distance" concept is used in the example of the Hybrid Combustion Facility described herein.

Using the Euclidian distance metric of Eq. 1, the parameter values of the input vector are represented by $X_i$ and the respective parameter values of the cluster reference point are represented by $Y_i$.

The cluster reference point can be selected in a variety of ways. For example, in one embodiment, the cluster reference point is taken to be the cluster centroid, which is defined as the average of the high and low values for each parameter in the vectors contained in the cluster. Referring to FIG. 6, point 104 represents the centroid. In another embodiment, the cluster reference point is defined as the cluster mean vector constructed using the mean value of every parameter contained in the cluster. Yet another embodiment defines a cluster reference point as that vector in the cluster having parameter values as close as possible to each corresponding parameter value in the input vector. Using this embodiment, in FIG. 6, point 100 is the closest point in the cluster to the input vector 106, and the distance D is determined between points 100 and 106 using the Euclidian distance formula above. Based on the distance from the input vector to the cluster reference point, D, the inductive learning module selects the cluster with the shortest distance D to the input vector as the closest cluster.

Other techniques can also be used for selecting the cluster reference point. Different choices for cluster references points can affect the performance of IMS by altering the parameter tolerances in individual clusters and the number of clusters in the final IMS knowledge base. For example, determining the distance between a vector and the closest point in a cluster rather than the centroid would typically result in shorter distances and be likely to incorporate more training vectors into fewer clusters rather than create a larger number of distinct clusters. Conversely, determining distance from the input vector to the furthest point in the cluster would be likely to result in a larger number of smaller clusters in the database. Smaller clusters (i.e., a smaller distance between upper and lower bounds) would typically provide tighter monitoring tolerances, which may not be desirable on systems with low accuracy or noisy sensors. Also, larger numbers of clusters in the database could increase the search time to identify the "nearest" cluster to an input vector, which may be disadvantageous for monitoring a system with a high data rate or monitoring with a slower computer. A balancing of database size with monitoring tolerance for the particular application is typically desirable.

After determining the cluster that is closest to the input vector, in step 124, the inductive learning module determines if the input vector is contained within the closest cluster of step 122. If so, the inductive learning module proceeds to step 112.

If, in step 124, the inductive learning module determines that the input vector is not contained within the closest cluster, in step 126, the inductive learning module determines whether the parameter values of the input vector are close enough to include that input vector in the closest cluster. A "cluster-expansion-distance threshold value," that is specified by a user, defines a maximum distance between the input vector and the closest cluster such that the input vector will be incorporated into the cluster. If the distance from the input vector to the closest cluster, determined above, is not greater than the specified cluster-expansion-distance threshold value, in step 128, the inductive learning module expands the closest cluster to include the input vector. In other words, the cluster parameter ranges are expanded to include the input vector in the cluster, thereby redefining the extent of the closest cluster. Step 128 proceeds to step 112.

In another embodiment of step 128, the cluster parameter ranges are expanded more than the minimum values that would include the input vector in the cluster. Such super-minimum parameter expansion is a useful procedure for allowing for uncertainty in the data measurements and/or to further generalize the training examples. The desired expansion factors can also be specified by the user. For example, the range for each updated parameter in the cluster can be expanded by the difference between the value of the parameter in the input vector and the nearest value to the input vector, plus a percentage of that value. A 2% expansion factor is adequate in many cases, particularly in cases with fairly focused clusters. One could also expand by a percentage of the difference between the parameter in the input vector and the cluster centroid. In addition, one could use an expansion factor to compensate in an approximate way for the estimated accuracy of the particular sensor generating the parameter. That is, if a sensor is known to be accurate to approximately 5%, one can add or subtract 5% for the value of that parameter in the vector. Other correction procedures can also be applied depending on the particular characteristics of the system under study and the monitoring application.

If, in step 126, the inductive learning module determines that the parameter values of the input vector are not sufficiently close to include the input vector in the cluster, the inductive learning module proceeds to step 120 to form the input vector into a new cluster. In other words, if the distance between the input vector and the closest cluster is greater than the cluster-expansion-distance threshold value (possibly including any expansion factors), a new cluster is generated based on the input vector.

It is often advantageous to scale or normalize the data values before they are inserted into the vectors. Arbitrary choices for units of measurement can cause some data values to be represented by large numbers while other data values are represented by small numbers, tending to skew calculations by over-weighting the large numbers. This is frequently undesirable and can be ameliorated or avoided by normalizing data values. Several normalization procedures can be employed.

Figure 8:
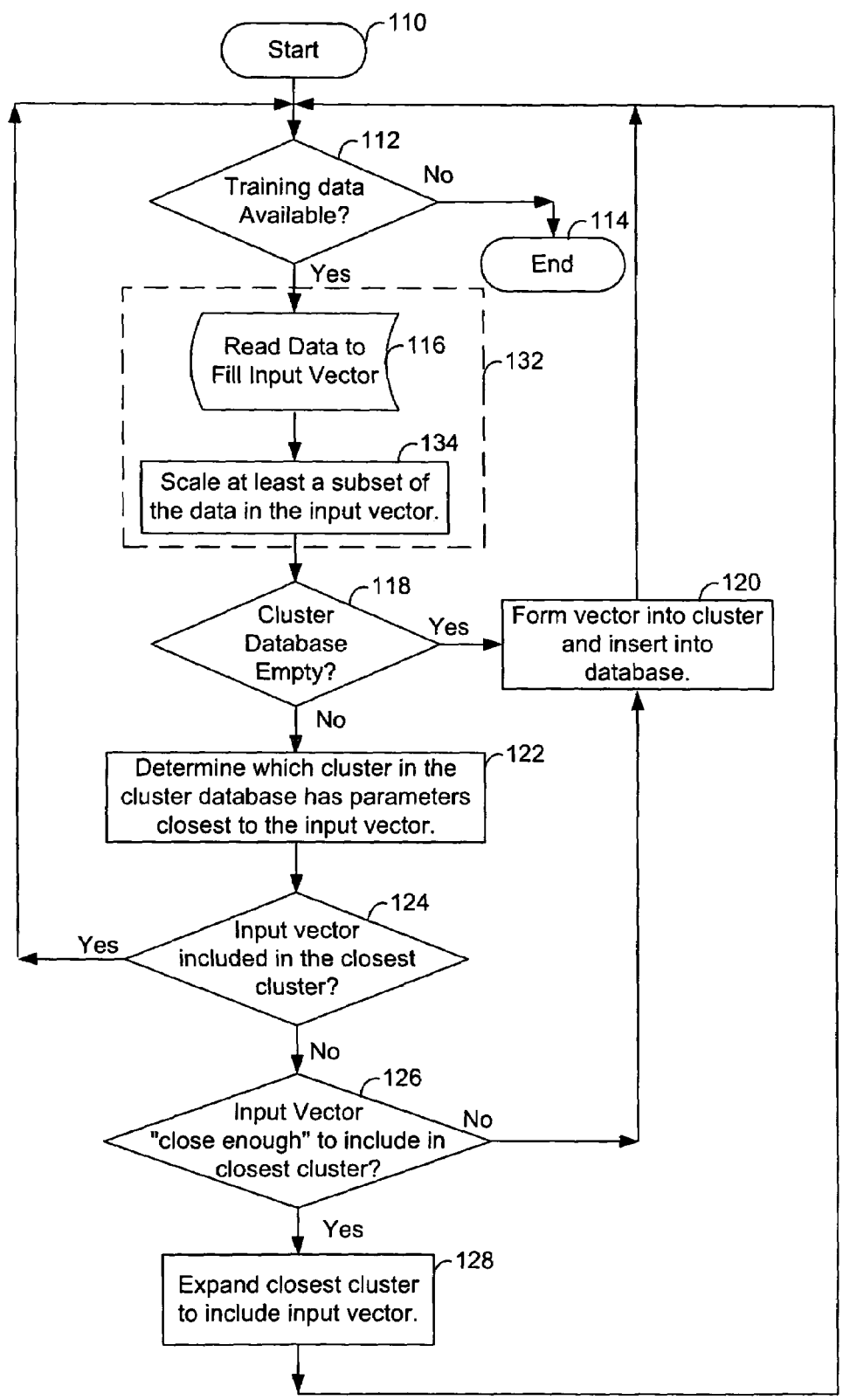
FIG. 8 depicts a flowchart of an embodiment of another technique to generate a cluster database which scales or normalizes at least a subset of the input parameter values of the input vector of the inductive learning module of FIG. 1.

FIG. 8 depicts a flowchart of an embodiment of the inductive learning module which scales or normalizes at least a subset of the input parameter values of the input vector. FIG. 8 is the same as FIG. 7 except for block 132; therefore the differences will be described. Step 116 reads the data to fill an input vector. In step 134, the inductive learning module scales at least a subset of the input data of the input vector. In another embodiment, represented by block 132, steps 116 and 134 are combined to scale the input data as it is read and before it is stored in the input vector.

For example, in one embodiment, each parameter is scaled to represent a percentage (or fraction) of a maximum range for that parameter, thereby causing every data value, $d_i$, of the vector to lie in the range $0 \leq d_i \leq 100.0$ (or $0 \leq d_i \leq 1.00$). This normalization procedure can be used to give the user a more intuitive understanding of the monitoring knowledge database and the significance of any off-nominal system behavior encountered during system monitoring.

In another embodiment, to scale the data, parameter values are weighted in comparison to other parameters, rather than being normalized to provide each parameter with substantially equal weight. For example, scaling a parameter to have a larger possible range relative to other parameters in the vector will tend to amplify any deviations in that parameter.

In addition to those described herein, other combinations of data normalization and distance metrics may be useful for various situations and can be empirically determined with typical training data and, in some embodiments, assumed off-nominal system data.

After IMS processes all of the training data, the result is a database of clusters (the system monitoring knowledge base) that characterizes system performance in the operating regimes covered by the training data. Each cluster defines one set of constraints on the values allowed for each parameter in any particular monitoring input vector. If there is no cluster in the monitoring knowledge base that contains a given input vector or is "near" that input vector, then the system is behaving in an unexpected manner indicating a possible system anomaly.

In another embodiment, IMS comprises a system monitoring module 30 (FIG. 1) that monitors a system by comparing incoming data with the clusters in the cluster or knowledge database to determine the "distance" (defined below) from the incoming sensor data to the nearest knowledge base cluster (or clusters). If the incoming sensor data lies sufficiently close to a cluster of the knowledge base derived from nominal system performance, the system is deemed to be functioning normally since it is sufficiently close to previous normal behavior. "Sufficiently close" is determined by threshold parameters supplied by the user to take into account that training data will not generally span the entire space of normal system operation, and the sensor data from nominally operating systems is inherently subject to a level of "noise," causing deviations in data received from sensors even for identically-operating systems.

In the event an incoming data vector has the same minimum distance with respect more than one cluster, that is, a tie, several procedures are possible. In some embodiments, the primary result of system monitoring is the distance to the nearest cluster from which a decision is made "nominal or off-nominal," in which case it does not matter which of two or more equidistant nearest clusters are considered. Ties become significant if the system monitoring procedure further examines the relationship of the input data vector to the nearest clusters (such as deriving information from the degree of deviation of individual parameters), or if clusters are distinguished among themselves (e.g. nominal vs failure, or clusters deriving from different operating modes). Distinguishing nearest neighbor ties in such cases typically depends on the details of the particular application under study.

An important function of IMS is to monitor system health, and IMS is not primarily intended to provide thorough system diagnostic information for off-nominal performance. However, some diagnostic information is available with IMS that can, in some circumstances, provide useful guidance. For example, the amount by which off-nominal data fails to meet the required threshold criteria (that is, the "distance" from the nearest cluster) can provide information as to the severity of the anomalous performance. In addition, the particular cluster closest to the suspicious system data can also provide useful guidance as the possible nature of the anomalous performance (and/or exclude certain types of system malfunctions).

If IMS detects off-nominal system performance, it can respond in at least one or more of the following ways: a) Alert the operator to the suspicious data. b) Activate system diagnostic procedures and/or software. c) Alter the mode of system operation in response to the suspicious data including initiating emergency shut-down. d) Determine the degree of "off-nominal" behavior and/or the nearest class defining nominal performance. Select one or more responses based on the results of this determination.

Automatic system health monitoring can significantly benefit from an accurate characterization or model of expected system behavior, that is "nominal" behavior. Among the advantages of IMS is the avoidance of difficulties often encountered in producing detailed health monitoring and/or diagnostic models of some systems and/or components, typically arising from the complexity and/or the unavailability of design information. Many current health monitoring schemes simply monitor system parameters one-by-one to ensure they do not exceed predetermined extreme thresholds. Such monitoring systems may not be able to detect early signs of anomalous behavior not involving the beyond-threshold excursion of any one parameter.

Some monitoring systems utilize an "expert" knowledge base or a detailed system model to provide tighter monitoring tolerances. Such techniques may not be feasible when system complexity and/or lack of resources (computing or otherwise) makes it difficult to develop such detailed models. In addition, even when such an expert knowledge base or detailed system model can be constructed, it is frequently too complex for feasible computer processing in real-time. It is desired in many applications that system health be monitored rapidly as the system is in service to detect and commence ameliorating action before off-nominal behavior becomes irretrievable or catastrophic. Examples are presented herein in which IMS responds in sub-millisecond times when monitoring the health of a complex engineered system (in particular, NASA's Hybrid Combustion Facility).

Other technologies, such as neural networks and decision trees, have been applied to the monitoring of complex systems attempting to overcome the modeling difficulties noted above. Such techniques typically suffer from the limitation of requiring both nominal and off-nominal training data in order to produce a feasible monitoring system. In addition, such monitoring systems typically produce system "models" that are difficult for humans to interpret. Since off-nominal system data is frequently difficult to obtain, IMS is designed to avoid this difficulty by building a system monitoring knowledge base entirely from nominal system data. The resulting IMS knowledge base clearly shows relationships between system parameters during normal operation and, in most cases, is easily processed to provide real-time (or near real-time) monitoring ability.

Figure 9:
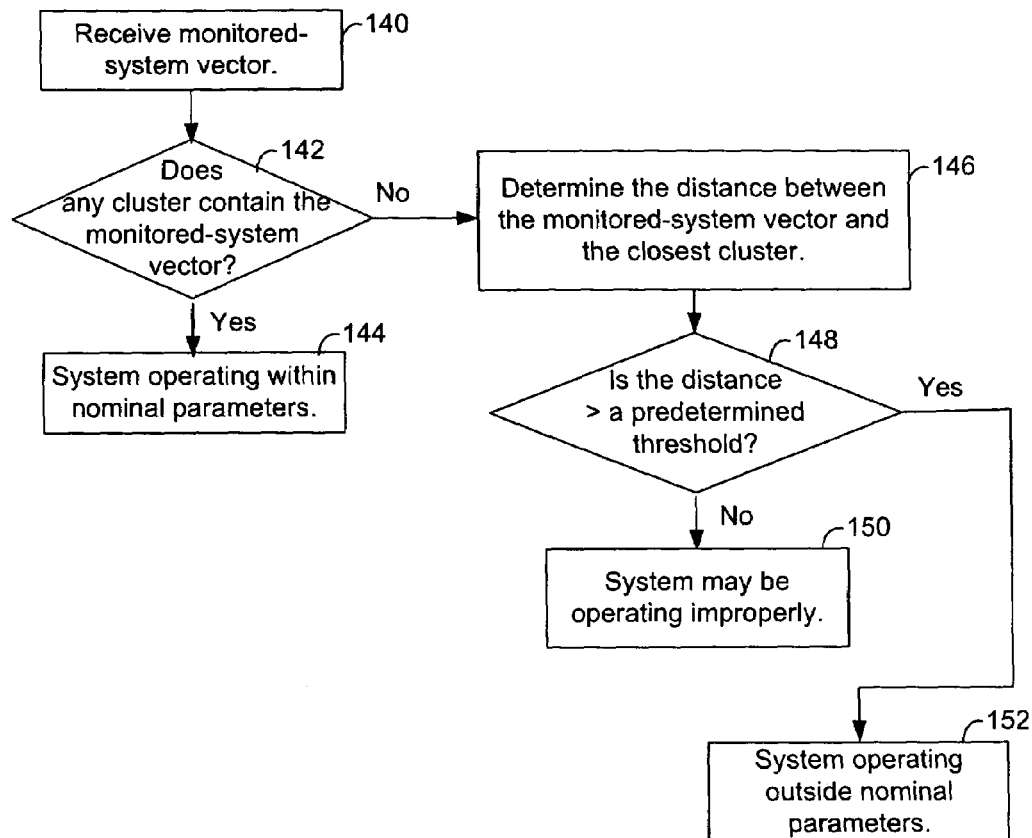
FIG. 9 depicts a flowchart of an embodiment of a technique used in the system monitoring module of FIG. 1.

FIG. 9 depicts a flowchart of an embodiment of the system monitoring module 30 of FIG. 1. In step 140, the system monitoring module receives an input vector, also referred to as a monitored-system vector. In one embodiment, the system monitoring module formats real-time (or near-real-time) input data into monitored system vectors. In another embodiment, the system monitoring module scales and/or normalizes the monitored-system vectors as described above with reference to FIG. 8. In step 142, the system monitoring module determines whether any cluster contains the monitored-system vector. If so, in step 144, the system monitoring module indicates that the system is operating within nominal parameters and proceeds to step 140. If, in step 142, the system monitoring module determines that no cluster contains the monitored-system vector, in step 146, the system monitoring module queries the cluster database to determine which cluster is closest to the monitored-system vector.

In step 148, the system monitoring module determines whether the distance between the monitored-system vector and the closest cluster exceeds a predetermined tolerance. In some embodiments, the system monitoring module is allowed to account for incomplete training data or measurement inaccuracies by setting a tolerance on the maximum allowable distance between the monitored-system vector and the closest cluster for the monitored-system vector to be considered nominal data. That is, the input monitored-system vector is "close enough" to its closest cluster to be considered nominal. If, in step 148, the distance is less than or equal to the predetermined tolerance, in step 150, the system monitoring module indicates that the monitored system may be operating properly. If, in step 148, the distance is greater than the predetermined tolerance, in step 152, the system monitoring module indicates that the monitored system is operating outside nominal parameters.

The system monitoring module of IMS can also, in some embodiments, make use of multiple tolerance values ("TVs") to determine the level of alert. An input vector outside the tightest tolerance $TV_0$ may justify that an alert be issued to the system operator. Input vectors lying outside increasingly generous tolerances, $TV_1$, $TV_2$, $TV_3$, . . . ($TV_0 < TV_1 < TV_2 < TV_3$ . . . ) could cause IMS to alert the system operator to the possibility of increasingly severe system malfunctions. For monitoring systems requiring extremely fast response times, a single distance tolerance of 0 may be appropriate (i.e., $0 = TV_0 = TV_1 = TV_2 = TV_3$ . . . ). This allows queries to the knowledge base to check only whether or not an input vector is contained in a cluster, thereby saving the time that would be required to compute the vector's distance from each cluster examined.

Some embodiments of IMS can gauge general system health or track general system behavior over time. For example, a larger vector can be formed by concatenating two or more consecutive sets of sensor data and this larger vector used with IMS techniques. Some embodiments of IMS can monitor the distance from nominal clusters of input vectors received during the time interval of interest, including the information that input vectors lie within a cluster, outside a cluster but within the tightest tolerance, the identity of the nearest cluster, among other attributes. Time dependent behavior of such distance data can be displayed in graphical form for the operator, transmitted to a diagnostic program for more detailed analysis, stored for future display and/or analysis, among other processing options. Another technique by which IMS can capture time dependent behavior over shorter time scales is to form vectors from several consecutive sets or frames of sensor data. That is, one vector includes data from several (or a great many) data readings collected from the same sensors. For example, successive sensor readings can be summed and divided by the number of readings to construct an average value for that particular parameter. Median values can also be accumulated, among other approaches to collecting time-accumulated sensor data. This approach provides different information from collecting and analyzing IMS output data over time, and provides an important and useful technique for monitoring system behavior.

Indexing and Retrieval

An efficient cluster indexing and retrieval method is advantageous in increasing the speed of IMS and allowing IMS to operate in real-time or near-real-time. In order to allow searching the IMS cluster database for the closest cluster, some embodiments of the indexing and retrieval scheme include a distance metric by which "closest" is defined and the ability to return the record of the cluster that is closest to the query point (input vector), not limited to those clusters containing the query point. The speed of search and retrieval should also be sufficiently fast so as to keep up with the anticipated rate of data acquisition. An efficient indexing and retrieval scheme can also help to increase the speed of the initial IMS training process, since training also performs "closest cluster" queries.

Various embodiments of the cluster indexing and retrieval methods used in connection with the present invention make use of one or more indexing reference points. It is convenient to describe first those embodiments employing a single indexing reference point and then describe generalizations to those embodiments using multiple indexing reference points.

Figure 10:
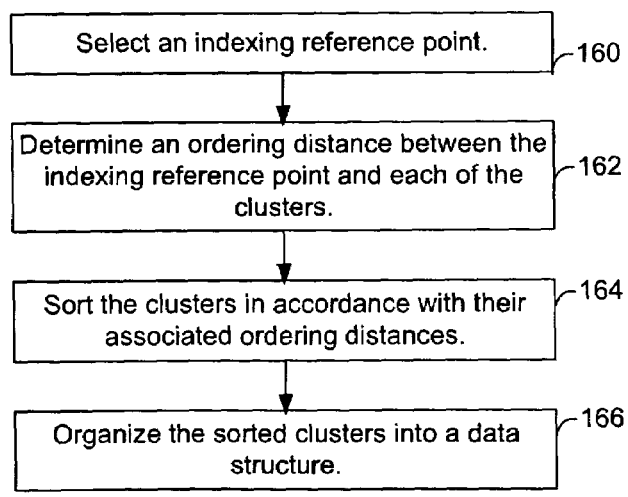
FIG. 10 depicts a flowchart of a typical cluster indexing technique to organize clusters for faster system monitoring.

FIG. 10 depicts a flowchart of typical embodiments of a cluster indexing technique employing a single indexing reference point. In some embodiments, the cluster indexing technique is part of the inductive learning module. In other embodiments, the cluster indexing technique is implemented in a separate module. The cluster indexing and retrieval technique typically makes use of the cluster distance concept. In step 160, an indexing reference point is selected. The choice of the indexing reference point is substantially arbitrary and can be chosen for convenience of calculation. For example, the indexing reference point can be the origin (all parameter values are zero), centrally located to many clusters, among other choices.

In step 162, a distance, referred to as the ordering distance, from the indexing reference point to each cluster is determined. As noted above, "distance to a cluster" can be determined from the indexing reference point to a cluster reference point selected for each cluster, or making use of maximum and minimum values of the distance from the indexing reference point to cluster members, among other methods. The ordering distance may be determined using the Euclidian distance formula described above, among others. Any of the techniques above for determining a cluster reference point may be used.

In step 164, the clusters are then sorted in accordance with their associated ordering distances. In step 166, the clusters are organized into a data structure, such as, for example, a list or search tree structure, based on the ordering distances. For example, the origin, in which all vector parameters are equal to zero, can be selected as the indexing reference point, and the minimum distance between the origin and each cluster is used as the cluster index. The clusters can then be sorted into a list with ascending index (ordering distance) value.

In other embodiments, the list of clusters can be assembled into a plurality of sublists, typically determined by a range of distances from the indexing reference point to the cluster. For example, one sublist can be constructed containing clusters from 0 to 100 distance units away from the indexing reference point. A second sublist having clusters from greater than 100 to 200 distance units away from the indexing reference point, and so forth until all clusters are included in at least one sublist. As described in detail below, multiple indexing reference points can also be employed, in which case multiple sublists will result, and a cluster can appear in more than one sublist.

Figure 11A:
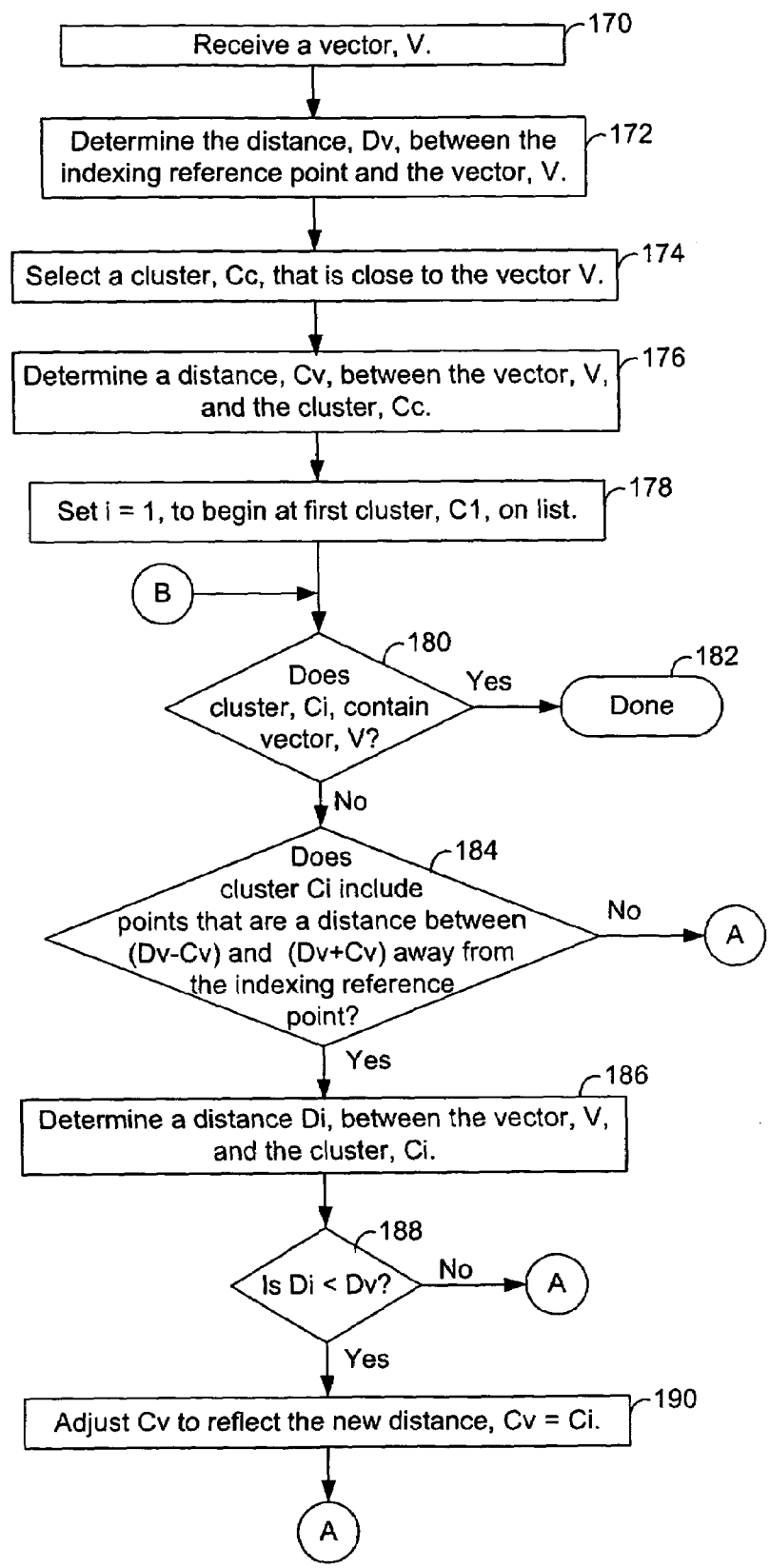
FIGS. 11A and 11B collectively depict a flowchart of an embodiment of a technique to access a cluster in a cluster database organized in accordance with the indexing technique of FIG. 10.
Figure 11B:
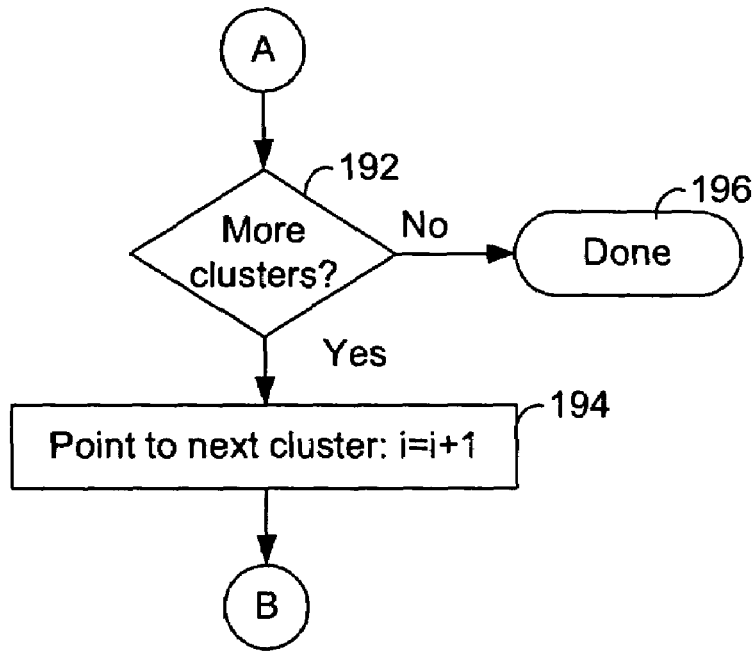

FIGS. 11A and 11B collectively depict a flowchart of a typical technique to access or to locate the cluster closest to a given input vector. The inductive learning module and/or the system monitoring module may use the technique of FIGS. 11A and 11B. The technique will be described in the context of the system monitoring module.

In step 170, the system monitoring module receives a vector, V. In step 172, the system monitoring module determines the distance Dv between the predefined indexing reference point that was used to index the clusters and the vector V. In step 174, an initial cluster Cc is selected from the cluster database. In some embodiments, cluster Cc is close to the vector V. Cluster Cc can be selected at random but it is advantageous if Cc is reasonably close to vector, V. In step 176, the distance Cv from the cluster Cc to V is determined.

If the clusters are organized into sublists, the sublists can be advantageously employed to help in the selection of a cluster Cc close to the input vector V. For example, the initial cluster Cc is conveniently chosen as the first cluster in that sublist that covers the distance range including the distance of the input vector from the indexing reference point.

It can then be shown that any cluster in the database that is closer to the vector V than Cc must include points that are a distance between MAX$\{0, (D_v-C_v)\}$ and $(D_v+C_v)$ away from the indexing reference point. For economy of notation we will use the expression Dv−Cv herein, understanding that if this expression is negative, it is taken to be zero. A proof of this proposition is included in the Appendix, incorporated herein by reference in its entirety. Thus, an efficient searching procedure involves beginning the search at the beginning of the list and computing distances from the vector V to clusters that cover any portion of the distance range of $(D_v \pm C_v)$. If a cluster is found that is closer to V than Cc, say Ck, adjust $C_v$ to reflect the distance from vector V to cluster Ck and continue the search. If a cluster is found that contains V, stop the search and return that cluster. Otherwise, continue the search in ascending index order until the minimum distance from vector V to the current cluster is greater than $(D_v+C_v)$ and return the closest cluster located thus far.

In step 178, a counter, i, is set equal to one to begin at a first cluster C1 on a list of clusters. Step 180 determines if cluster Ci contains the vector V. If so, in step 182, the search ends. If not, step 184 determines if a cluster Ci includes points that are a distance between (Dv−Cv) and (Dv+Cv) away from the indexing reference point. If so, in step 186, a minimum distance Di between the vector V and the cluster Ci is determined. Step 188 determines if Di is less than Dv. If so, in step 190, Cv is adjusted to reflect the new distance. In other words, Cv is set equal to Ci. The flowchart continues to FIG. 11B. Step 192 determines if there are more clusters in the list to check. If so, step 194 increments i by one to point to the next cluster, and proceeds to step 180. If step 192 determined that there are no more clusters in the list to check, in step 196, the process ends.

If step 184 determines that a cluster Ci does not include points that are a distance between (Dv−Cv) and (Dv+Cv) away from the indexing reference point, the process proceeds to step 192. If step 188 determines that Di≧Dv, the process proceeds to step 192.

When the clusters are organized into sublists on the basis of distance, a different search strategy can be advantageously employed. The search begins by searching the sublist that includes the distance from the input vector to the indexing reference point, typically following the methods described in FIGS. 11A and 11B. If a match is found (that is, a cluster contains the input vector), the search terminates and the cluster found to contain the input vector is returned as the result of the search. If no match is found, adjacent (in distance) sublists are searched in the same manner if they cover any region of distance in the range Dv±Cv. If no sublists satisfy these criteria, the most recently located cluster nearest to the input vector is returned. The search continues until all sublists covering the distance Dv±Cv have been searched.

The present indexing and retrieval schemes are not limited to a single indexing reference point, m, but can employ multiple indexing reference points, m, n, o, p . . . In these cases, the process of narrowing the cluster search is iterative. Initially, a set of clusters is selected for searching whose members are those clusters that lie within a distance $Dv_m \pm Cv$ of the first indexing reference point, m. From this set of clusters, the "m set," a second set of clusters is chosen whose members also lie within a distance $Dv_n \pm Cv$ of reference point n, the "mn set." This process proceeds, producing sequentially "mnop . . . sets" of clusters until all reference points have been used. Since the procedure is essentially an iterative process of set intersection, at each stage the size of the set of clusters to be searched will typically decrease but may stay the same size. The cluster search is thus narrowed to the (typically) smaller set of clusters, for example, the mno set for the case of three indexing reference points.

These indexing and retrieval schemes (including variations with more than one reference point and different search data structures) have proven to be effective with IMS system monitoring, but other schemes can be adapted as warranted by the deployment and size of the cluster database.

Additionally, to limit database size and increase query efficiency, a separate IMS cluster database could be generated for different modes of system operation, and the appropriate database queried when the system is operating in the mode appropriate for the particular knowledge base. For example, rather than have a single knowledge base for monitoring the performance of a helicopter, one could construct separate databases for hovering, idling, climbing, and other modes of operation, and query the appropriate database for the particular mode of helicopter operation. This embodiment of IMS involves pre-selecting a knowledge database to query from among a plurality of knowledge databases on the basis of one or more system parameters. Query efficiency can be additionally increased by making use of sublists as described above.

As noted, in another embodiment, selecting a monitoring distance tolerance of zero can increase monitoring speed. This embodiment eliminates the calculation of distances between the input vector and database clusters. Zero distance tolerance also allows the use of more efficient search structures. Any search technique that is able to determine if an input vector is contained in a cluster is appropriate. A decision tree structure similar to those produced by Quinlan's ID3 system can provide efficient monitoring performance in this case. The branch points of the decision tree would be determined by the parameter ranges represented in the IMS clusters. The use of sublists can further increase query efficiency.

Other techniques can be used with IMS to build decision trees, artificial neural networks, support vector machines, or other structures that use training sets including both nominal and off-nominal data in order to generate a system monitoring knowledge base. IMS can be used to generate data for these types of systems, among others, using only nominal training data. It may also be desirable to convert an IMS knowledge base into one of these other forms to facilitate integration with an existing monitoring system, or to provide a more compact knowledge representation.

Figure 12:
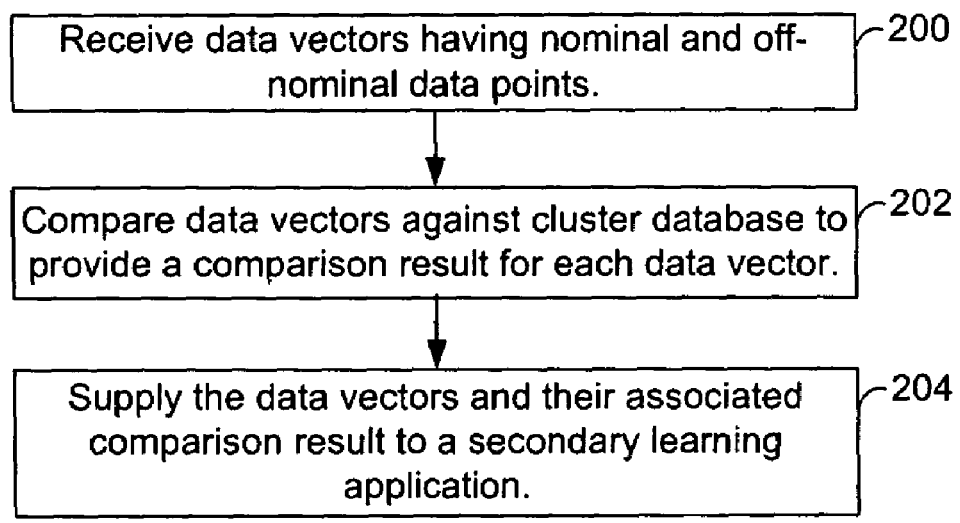
FIG. 12 depicts a flowchart of an embodiment of a technique using the system monitoring module to generate training data for another learning application.

FIG. 12 depicts a flowchart of an embodiment of a technique for using the system monitoring module to generate training data for another learning application, typically non-IMS. To produce training data suitable for these other techniques, one can submit a wide variety of data vectors to an already-generated IMS knowledge base (generated with nominal data) and record the results. In step 200, data vectors are received having both nominal and off-nominal data values. In one embodiment, the nominal and off-nominal data values may be evenly distributed in the vector space, or, alternately, strategically selected for effective training of the secondary (non-IMS) learning application. In step 202, the data vectors are compared against the cluster database to provide a comparison-result for each data vector. In step 142, the data vector-comparison-result pairs are supplied as training input data to the secondary learning application to produce a desired monitoring knowledge base. In one embodiment, for example, the comparison-result indicates whether the data vector is in a cluster, that is, has nominal parameter values, or not in a cluster, that is, has off-nominal parameter values. In another embodiment, depending on the secondary learning application, the numeric IMS vector distance values are used as the "comparison-results" for each input vector. In yet another embodiment, grouping thresholds are defined to group ranges of distances values into classes and a class identifier is also supplied with the "comparison-results" for training the secondary learning application.

When monitoring with IMS, it is possible for a monitoring parameter contained in the IMS cluster database to become irrelevant or unusable for the monitoring task. For example, a system sensor may fail and give erroneous readings that cause false alarms. One way to deal with this situation is to redefine the parameter vector and regenerate the cluster database without the unreliable parameter(s). In another embodiment, the monitoring search technique adjusts the parameter values so that parameters that rely on the faulty input data will always match any range specified for those parameters in any cluster. This effectively ignores the erroneous data at the expense of somewhat less accurate monitoring. The distance metric or monitoring tolerances may be adjusted as appropriate to account for changes caused by parameter exclusions.

Figure 13:
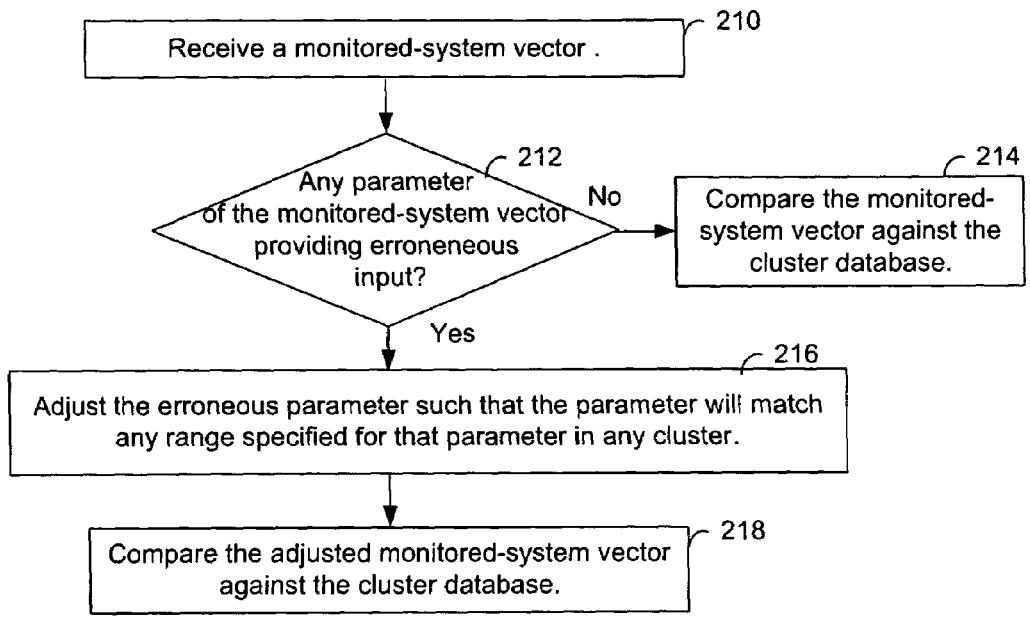
FIG. 13 depicts a flowchart of an embodiment of a technique to adjust erroneous parameters in the system monitoring module of FIG. 1.

FIG. 13 depicts a flowchart of an embodiment of a technique to adjust erroneous parameters of the system monitoring module. In step 210, a monitored-system vector is received. Step 212 determines if any parameter of the monitored-system vector is erroneous. For example, the parameters are compared to respective predefined operational-input ranges, and if a parameter is outside its operational-input range, that parameter is in error. If not, in step 214, the monitored-system vector is compared against the cluster database. If so, in step 216, the erroneous parameter(s) is adjusted such that the parameter(s) will match any range specified for that parameter in any cluster to provide an adjusted monitored-system vector. In step 218, the adjusted monitored-system vector is compared against the cluster database.

In addition to scaling input parameters, it is often advantageous to scale the IMS output to represent a percent deviation from the nominal value, or other value readily interpreted by a human operator. For example, if the range of distances available in the parameter space is from 0 to 94000 and IMS returns a distance to the nearest cluster of 940, "1% deviation" is likely to provide more meaningful information to the operator than the raw data of "940 deviation."

Several courses of action could be taken if a query to the IMS finds that a data vector is suspect during system monitoring. For instance, the anomaly could be logged, an operator could be notified, or an automated diagnostic routine could be invoked. It is also possible to use the IMS techniques to produce diagnostic databases if there are data sets available that represent known system anomalies. A system simulator that allows simulated failures or data from specific system failure tests are useful for producing IMS diagnostic databases. One could train IMS using the anomalous data for a given failure in the same way that it is trained using nominal data. When off-nominal data is detected by IMS, the suspect vectors can be compared to the diagnostic cluster databases. If there is a close match with a particular database, then the failure represented by that database is a candidate for the diagnosis.

Figure 14:
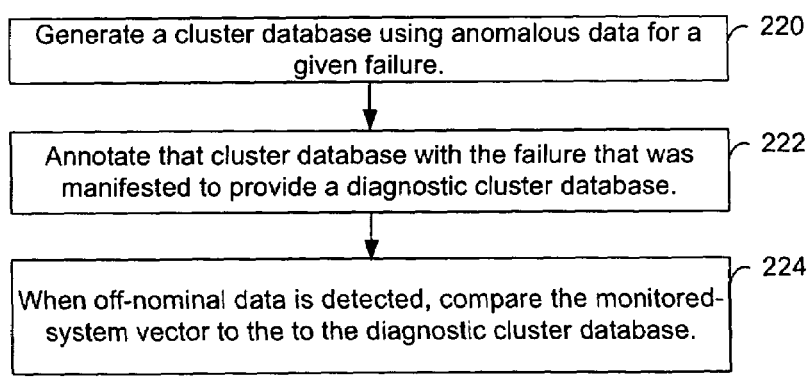
FIG. 14 depicts a high-level flowchart of an embodiment of a technique to generate a diagnostic cluster database in the inductive learning module and, in the system monitoring database, monitoring data using the diagnostic cluster database.

FIG. 14 depicts a high-level flowchart of an embodiment of a technique to generate a diagnostic cluster database in the inductive learning module and monitoring data, in the system monitoring module, using the diagnostic cluster database. In step 220, the inductive learning module generates a cluster database using anomalous data for a given failure. In step 222, the inductive learning module annotates that cluster database with the failure that was manifested to provide a diagnostic cluster database. In step 224, when off-nominal data is detected, the system monitoring module compares the monitored-system vector to the diagnostic cluster database to attempt to identify the failure. If a monitored-system vector is within, or sufficiently close to, a particular cluster in the diagnostic cluster database, a user could be informed of the annotation describing the failure associated with the particular cluster, among other possible actions.

Figure 15:
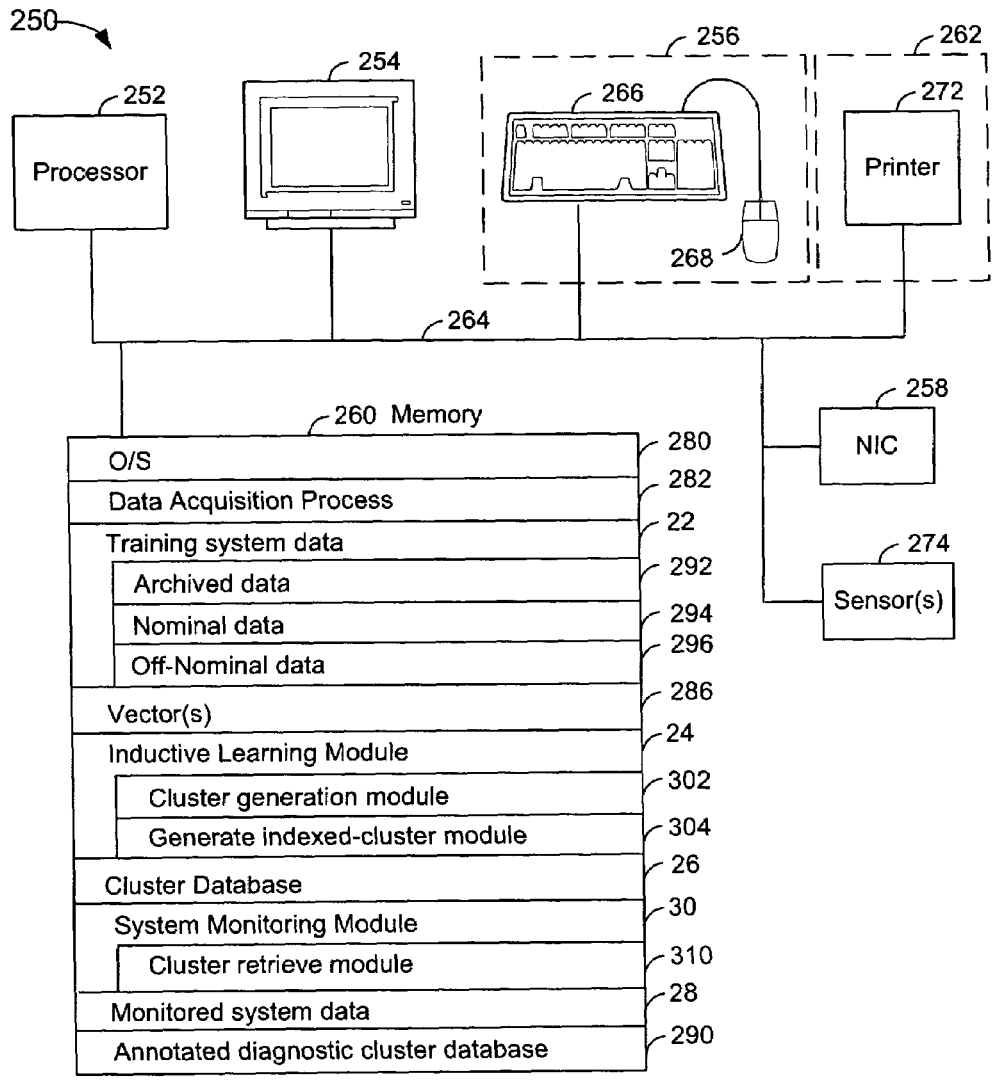
FIG. 15 depicts a high-level block diagram of an exemplary computer system that can be used for implementation of the inductive monitoring system.

FIG. 15 depicts an illustrative computer system 250 that utilizes the teachings of the present invention. The computer system 250 comprises a processor 252, a display 254, input interfaces 256, communications interface 258, memory 260, and output interfaces 262, all conventionally coupled by one or more busses 264. The input interfaces 256 comprise a keyboard 266 and mouse 268. The output interface 262 is a printer 272. The communications interface 258 is a network interface card (NIC) that allows the computer 250 to communicate via a network, such as the Internet. Sensors 274 are also coupled to the processor 252. The sensors 274 supply real-time input data.

The memory 260 generally comprises different modalities, illustratively semiconductor memory, such as random access memory (RAM), and disk drives. Depending on the embodiment, the memory 260 stores one or a combination of the following: an operating system 280, data acquisition module 282, in some embodiments training system data 22, vectors 286, the inductive learning module 24, the cluster database 26, the system monitoring module 72, in some embodiments monitored-system data 28 and an annotated diagnostic cluster database 290. The operating system 280 may be implemented by any conventional operating system such as UNIX®, WINDOWS®, and LINUX®, among others.

The training system data 22 may typically comprise any of archived data 292, nominal data 294 and off-nominal data 296. The inductive learning module 24 typically comprises a cluster generation module 302 that, for example, implements the flowchart of FIG. 7, or alternately FIG. 8. The inductive learning module also typically comprises a "generate indexed-cluster module" 304 that, for example, implements the flowchart of FIG. 10. The system monitoring module 30 typically comprises a cluster retrieve module 310 that, for example, implements the flowchart of FIGS. 11A and 11B.

Various embodiments of the present inventive techniques are typically incorporated in the inductive learning module 24, the cluster database 26 and the system monitoring module 30. Generally, the inductive learning module 24 and the system monitoring module 30, are tangibly embodied in a computer-readable device, carrier or medium, for example, memory 260, and are comprised of instructions which, when executed, by the processor 32 of the computer system 250, causes the computer system 250 to utilize the present invention.

Various embodiments of the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. Those skilled in the art will recognize that many modifications may be made to this configuration without departing from the scope of the present invention.

The exemplary computer system illustrated in FIG. 15 is not intended to limit the present invention. Other alternative hardware environments may be used without departing from the scope of the present invention.

EXAMPLES

A Hybrid Combustion Facility ("HCF") at the NASA Ames Research Center is used to investigate the combustion properties of hybrid fuel formulations intended for use in rocket propulsion. A hybrid rocket is one in which the fuel is in a solid form and the oxidizer is in liquid form, a formulation that has several potential advantages over conventional solid or liquid fueled rockets. For example, hybrid fuels have increased safety in manufacturing, handling and in use. The fuel is not volatile but, unlike conventional solid fuel rockets, hybrid fuel rockets can be throttled to alter the thrust of the rocket after ignition. The HCF is a scale-up of various bench tests of hybrid fuel rockets and is highly instrumented. Thus, HCF offers a good opportunity to test the Inductive Monitoring System ("IMS") described herein with a realistic operational system and in comparison with other techniques for monitoring the performance (or "health") of a complex system as part of an overall NASA program to examine various Integrated Vehicle Health Management (IVHM) techniques. Numerous references to IVHM architectures and applications can be found on NASA and other websites, various conference proceedings including the paper entitled "Integrated System Health Management for Reusable In-Space Transportation Systems" published in the *Proceedings of the 54$^{th}$International Astronautical Congress of the International Astronautical Foundation, the International Academy of Astronautics and the International Institute of Space Law*, 29 September-3 October 2003, Bremen Germany, Ref. No. IAC-03-IAA.13.1.02 (incorporated herein by reference).

Prior to a firing of the Hybrid Combustion Facility, oxidizer stored in the liquid oxygen ("LOX") tank is pumped through a vaporizer, where the oxidizer is gasified, and enters the gaseous oxygen ("GOX") tank. Over a time interval, up to an hour, GOX flows into the GOX tank until the tank pressure reaches the required level for the desired mass flow rate and run duration. At this point, the LOX feed system is isolated from the GOX tank by closing a first shutoff valve between the vaporizer and the GOX tank. The operator enters the desired run setpoints into a control computer. These set points include parameters for control valve scheduling, ignition timing, desired delivery pressure and configuration information. After a firing countdown is completed, an upstream shutoff valve is opened. The resulting GOX outflow chokes at an orifice (sonic nozzle) and continues into the combustion chamber. A short time later, the ignition system oxidizer and fuel flow are turned on and ignited by a spark. High temperature combustion products from the ignition system are injected into the combustion chamber to vaporize paraffin fuel, which mixes with the free stream oxidizer and the ignition products to ignite the paraffin fuel in a self-sustaining combustion reaction. As the GOX tank pressure decreases during the course of a firing, the control valve opens to maintain constant delivery pressure and constant mass flow to the combustion chamber. A Venturi in the GOX feed line measures the oxygen flow rate but is accurate only for steady state operating conditions. The orifice measures the mass flow rate more accurately during transients and also serves to isolate any pressure fluctuations in the combustion chamber from the feed system. A check valve located upstream prevents reverse flow of combustion gases from entering the GOX feed line. Two burst disks located downstream from the orifice and one burst disk located upstream from the GOX tank protect against over-pressurization. Pressure sensors are located at the GOX tank, at the orifice and at the combustion chamber. A high frequency pressure sensor for the combustion chamber and a differential pressure sensor are located at the Venturi. The GOX temperature is measured upstream from the orifice.

Figures 16, 17:
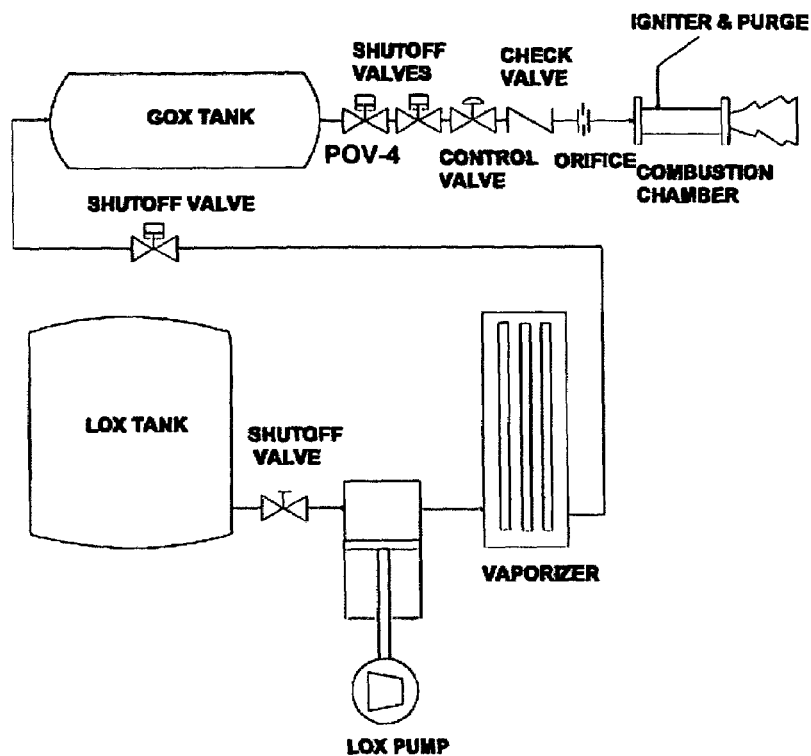
FIG. 16 depicts a schematic block diagram of the subsystem of the Hybrid Combustion Facility for oxygen vaporization and oxygen supply to the combustion chamber.
FIG. 17 depicts a typical vector used by the inductive monitoring system to learn and then to monitor the performance of the oxygen supply subsystem of the Hybrid Combustion Facility.

IMS was used to build a monitoring knowledge base for the gaseous oxygen ("GOX") delivery system on the HCF, as schematically depicted in FIG. 16. The primary function of the GOX system is to vaporize liquid oxygen ("LOX") and to provide gaseous oxygen to the combustion chamber at an appropriate rate to sustain the HCF combustion process. A malfunction in the GOX delivery system would typically result in an unexpected flow rate for a given pressure and configuration of valve settings. For convenience in capturing flow rate data in the definition of the IMS data vector, sensor readings from two consecutive data samples (or "frames") were combined into a single vector. As conveniently used in this example, each data vector has seven data elements as shown in FIG. 17, in which:

"POV-4, Position" is the current position (in degrees open) of the shutoff valve (see FIG. 16).

"PCV-6, Position" is the current position of the control valve (situated between the GOX tank and the combustion chamber).

"PIT3, Pressure" is the current pressure of the GOX tank (typically in the range from 0 to approximately 3,000 psi).

"PT6, Pressure" is the feed pressure just upstream of the sonic orifice delivering GOX to the combustion chamber (typically in the range from 0 to approximately 3,000 psi).

"PIT3-PT6, Difference" is the difference between PIT3 and PT6.

"PIT3, Change" is the change in GOX tank pressure PIT3 since the last data sample.

"PT6, Change" is the change in the orifice feed pressure, PT6, since the last data sample.

Thus, the seven element data vector of FIG. 17 captures four current operating parameters, two parameters incorporating changes from the previous data frame and one parameter derived as the difference of two other parameters within the current data frame. Incorporating the pressure change (difference) between PIT3 and PT6 provides a normalization parameter that allows IMS to form more general behavior classes not depending on specific pressure values for PIT3 and PT6.

While it is expected that other data vector definitions, other parameter choices, and the like, would also work with IMS, the data vector of FIG. 17 provided acceptable results for the particular example considered here.

Fifteen data sets were collected from test firings of the HCF in which sensor data was collected and was sufficiently complete for use in training and testing IMS. No significant anomalies were detected in the performance of the GOX delivery system for any of the 15 test firings. Nine of the data sets used a larger orifice diameter on the sonic orifice than the other six. The nine "large orifice" data sets were used to train IMS and were defined to be "nominal" system performance. The six data sets obtained with the use of the small sonic orifice were then tested against the trained IMS. When properly classifying system health, these six "small orifice" data sets should be reported as "suspect."

Example 1

The nine data sets collected with large orifice firings of the HCF ("nominal" data sets), were used to train the IMS. Vectors from three of the nine data sets were used as "basis classes" with each vector forming a nominal class containing one member. Three additional data sets from the nine were used to expand the initial basis class definitions through interpolation. For most vectors in these sets, the previously-defined class that was closest to a vector was expanded to include the vector as well as any data values lying between the vector and the class. If a training vector was too far away from any of the previously defined classes, a new nominal class was formed containing that vector as its initial member. The class closest to a vector is defined as that class that would require the least amount of expansion in order to incorporate that vector. Vector distance (or required expansion) is measured as the sum of percent changes in each vector parameter that is required to include the new vector. For example, if the new training vector is {85, 23, 2027, 1202, 825, 41, 6} and a class was found containing the vector {85, 22, 2030, 1200, 830, 44, 8}, the difference between these two vectors would be {0, 1, 3, 2, 5, 3, 2}. The difference for each parameter is then divided by the range of possible values for that parameter to obtain a percentage change. The percentage changes thus obtained are summed, and the result is the "distance" between the new vector and the closest vector in the class. Once the class with the "least required expansion" (lowest percentage sum) is identified, the new vector and vectors with parameters falling between the new vector and the closest vector in the class are added to the class (if it is within a specified maximum distance from the class.)

The last training step in this example uses the three remaining data sets (from the nine) to estimate an upper and lower error bound for each data parameter. IMS identified the class that was "closest" to each of these three new training vectors. However, instead of including the new vector and its neighbors into the closest class, IMS adjusted a global weight to be added to or subtracted from each vector parameter when testing for class membership. The weight values are intended to compensate for inaccuracies in the sensor data and for the limitations of the training data sets. When a set of weights was found that classified all of the data sets in the third group as "nominal" data, the IMS training was complete.

After training as described above, IMS was tested using two "nominal" (large orifice) data sets and four "off-nominal" (small orifice) data sets that had not been included in the IMS training data. Thus, a total of 17 data sets were used, 9 nominal data sets for training, 2 additional nominal data sets for testing and 6 off-nominal data sets for testing. The data vectors from each set were processed with the IMS monitoring knowledge base, presented in the same order as they were collected from the HCF. IMS correctly identified the off-nominal data sets as suspect soon after the shutoff valve was opened. The IMS also correctly processed the two additional nominal data sets, finding that the data sequences were properly included in the nominal classes in the knowledge base. Therefore, we conclude that if IMS were installed in the HCF facility, alerts would have properly been sent for off-nominal data sets (but not for nominal), promptly alerting the operator or possibly initiating a system shut-down.

Example 2

In addition to actual sensor data collected from HCF firings, the IMS was tested on simulated data. Interval Constraint Simulator software ("ICS") was developed at NASA Ames Research Center to provide a fast, flexible system modeling and simulation tool. Further description of ICS can be found in Attachment A, which is incorporated herein by reference. The ICS was used to simulate the HCF and to produce 1,200 simulated HCF runs. These simulated data sets were divided into three groups and used to train the IMS as in Example 1. However, these simulated data sets used to train the IMS and create the monitoring knowledge base did not reproduce the noise characteristics of actual HCF data collected by sensors. As a result the IMS trained on simulated data was not effective in monitoring actual (measured) data sets.

IMS monitoring improved on actual data when three actual data sets (including noise) were added to the training set. The incorporation of actual data sets allowed IMS to incorporate data noise characteristics into the knowledge base and more faithfully to monitor the actual HCF performance. When this updated knowledge base (including data sets with actual noise) was tested on simulated data sets not used for IMS training, this updated knowledge base provided monitoring results similar to that produced by the knowledge base trained on strictly simulated data. Thus, the addition of even a small number of actual system data to the IMS training sets improved IMS performance on actual system test data, but did not seriously degrade the performance of IMS when tested on simulated test data.

Other approaches can be used to train IMS using simulated data and yet train IMS for monitoring actual operating systems. For example, the acceptable deviations from nominal values during system monitoring can be increased to account approximately for sensor noise. Additionally, wider tolerances can be used when expanding the clusters during IMS training to account for expected sensor noise. More realistic system simulations (including sensor noise) can be employed for IMS training, thereby providing a better match to actual system data profiles.

This ability to train with simulated data enables IMS to produce useful monitoring knowledge databases for systems lacking an extensive archive of actual performance data. In addition, the use of simulated data allows IMS to include information about previously unexplored system operating regimes in the monitoring knowledge base by simulating such regimes before an actual system run.

Example 3

IMS was trained with simulated data as in Example 2. All IMS training data that was used to construct the system monitoring knowledge base was derived from nominal simulations. Simulated test data was then generated including a system failure. In particular, a failure was injected near the end of the simulation that caused the shut-off valve POV-4 to stick open at 20 degrees instead of fully closing. When the data from the failure simulation was processed by IMS, the off-nominal system performance was detected within two data frames (0.2 simulated seconds) of the occurrence of the failure. Although IMS in the embodiment employed here did not identify the shut-off valve as the cause of the off-nominal behavior, rapid detection of an anomaly was achieved.

Example 4

The IMS monitoring technique of these examples was not optimized for speed, although initial timing tests appear to be promising. A linear search was used to match input data with the classes of the monitoring knowledge base formed from the 1,200 simulated training data sets of Example 2. Data records were read sequentially from a disk file. Running on a Sun Microsystems Blade 1000 workstation with a 750 MHz processor, IMS achieved a processing speed of approximately 2,000 data records per second. A Sun Ultra 10 with a 300 MHz processor was able to process approximately 700 records per second. It is expected that IMS would be able to process at kilohertz data rates if the data acquisition interface were able to transfer data sufficiently rapidly.

Although the above application of IMS to the HCF used three training data subsets and three training phases, other embodiments of IMS can also be employed. For example, some embodiments of IMS combine these three training steps into one pass through all training data, and do not use a division of training data into subsets. While it is expected that such embodiments of IMS will give similar system monitoring accuracy, some embodiments may be advantageous in terms of computational simplicity and/or training and monitoring speed.

Example 5

IMS is currently performing real-time system health monitoring for a UH-60 Blackhawk research helicopter at the NASA Ames Research Center. The two turbine engines on the helicopter are monitored by means of a separate IMS cluster database for each engine. Data is collected at a rate of 4 Hz and transmitted over a MIL-STD-1553 Data Bus to the IMS computer on board the helicopter. The IMS data vectors include three time samples where each sample includes sensor values for: 1) Engine torque. 2) Stage-1 compressor speed. 3) Stage-2 compressor speed. 4) Fuel flow. 5) Rotor speed. Thus, five sensor values at three consecutive time samples result in 15 data values in each IMS vector.

IMS was trained with data collected on ten helicopter flights and two cluster databases were formed for system monitoring, one for each engine. During system monitoring, the data from each engine is evaluated by IMS by means of the corresponding engine-specific cluster database in real-time as collected. The data is displayed on a video display on board the helicopter as well as stored for later analysis. To date, no actual in-service system anomalies have occurred. However, IMS was tested by means of a simulated system anomaly. Specifically, the fuel flow values were increased by 10% to 15% in one engine for a period of time. IMS detected this anomaly and displayed a significant "deviation from normal" value on the display.

Although various embodiments which incorporate the teachings of the present invention have been shown and described in detail herein, those skilled in the art can readily devise many other varied embodiments that still incorporate these teachings.

APPENDIX

It is desired to show that any cluster in the database that is closer to the vector V than cluster Cc must include points that are a distance between (Dv+Cv) and MAX{0, (Dv−Cv)} away from the indexing reference point. Herein we assume (Dv−Cv)≧0. The case in which (Dv−Cv)<0 and is replaced by 0 proceeds by the same arguments.

Recalling that Cv is the distance between the input vector V and cluster Cc, consider the region of (N dimensional) space containing the point defined by vector V and all points that are a distance from 0 to Cv away from V. We call this a "ball" around point V, $B_v$. Recalling that Dv is the distance of point V from the indexing reference point, $B_v$ contains a point closest to the indexing reference point and a distance (Dv−Cv) or less from the indexing reference point. $B_v$ also contains a point farthest from the indexing reference point at a distance (Dv+Cv) from the indexing reference point. $B_v$ may or may not contain the indexing reference point.

If Bv does not contain the indexing reference point, consider all points in space having a distance between (Dv−Cv) and (Dv+Cv) from the indexing reference point. We call this shell around the indexing reference point $S_i$. $S_i$ contains all of the points of $B_v$. Any point outside of $S_i$ lies at a distance less than Dv−Cv, or greater than Dv+Cv, from the indexing reference point. Also, since $S_i$ contains all of $B_v$, no point outside of $S_i$ will be in $B_v$ and, therefore, no point outside of $S_i$ will be closer to V than Cc. This means that any point less than a distance Dv−Cv or greater than Dv+Cv from the indexing reference point will be further from V than Cc.

If $B_v$ contains the indexing reference point (that is, V is closer to the indexing reference point than it is to Cc), $S_i$ becomes a sphere around the indexing reference point with radius Dv+Cv as the inner radius of the $S_i$ shell collapses to zero. All points lying outside this sphere $S_i$ also lie outside the sphere $B_v$, so only points less than a distance Dv+Cv from the indexing reference point can be closer to V than Cc.

What is claimed is:

1. A method of inductive learning comprising providing a computer that is programmed:
   to provide or receive training data, including at least one of archived data, simulated nominal data and off-nominal data;
   to provide vectors having a set of parameters determined from the training data;
   to generate a cluster database comprising clusters that are associated with respective ranges of values for at least a subset of the set of parameters;
   to index the clusters of the cluster database based on an indexing distance of each of the clusters from a predetermined indexing reference point;
   to organize the clusters into a data structure of clusters based on the cluster indexing; and
   to display a relationship between at least one of the vectors and the data structure in a visually perceptible format.

2. The method of claim 1 wherein said process of generating comprises:
   determining a separation distance between a selected test vector and one of said clusters, and
   producing a new cluster including the test vector, when the separation distance exceeds a threshold value.

3. The method of claim 2, wherein said computer is further programmed to determine a deviation distance by dividing said separation distance between said test vector and said one of said clusters by a value representing a range of values of at least one variable in said one of said clusters, and to associate the deviation distance with a severity of a deviation of the at least one monitored-system vector from a nearest cluster.

4. The method of claim 1 wherein said process of generating comprises:
   determining a separation distance between a selected test vector and at least one of said clusters, and
   expanding the at least one cluster to include the test vector when the separation distance is less than or equal to a threshold value.

5. The method of claim 4, wherein said computer is further programmed to determine a deviation distance by dividing said separation distance between said test vector and said one or said clusters by a value representing a range of values of at least one variable in said at least one of said clusters, and to associate the deviation distance with a severity of a deviation of the at least one monitored-system vector from a nearest cluster.

6. A method of monitoring a system comprising providing a computer that is programmed:
   to provide or receive a cluster database comprising clusters that are associated with respective ranges of values for at least a subset of a set of cluster parameters;
   to receive at least one monitored-system vector having monitored-system parameters, with parameter values generated by sensors that provide data measured on a monitored system;
   to determine whether the at least one monitored-system vector is contained in any of the clusters based on at least a subset of the monitored-system parameters and the subset of the cluster parameters; and
   when at least one of the monitored-system vectors is not contained in any cluster, to determine a deviation distance of the at least one monitored-system vector from a nearest cluster, to associate the determined deviation distance with a severity of a deviation of the at least one monitored-system vector from the nearest cluster, and to display in a visually perceptible format at least one deviation distance for the parameter values for the at least one monitored-system vector from the corresponding parameter values for the nearest cluster.

7. The method of claim 6, wherein said computer is further programmed:
   to provide an additional database of clusters, associated with respective ranges of values for at least a subset of said set of parameters, the additional cluster database being annotated with diagnostic information; and
   when at least one of said monitored-system vectors is not included in any cluster, to compare at least one of said monitored-system vectors with at least one of the clusters of the additional cluster database.

8. An apparatus for inductive learning comprising a computer that is programmed:
   to provide or receive training data, including at least one of archived data, simulated nominal data and off-nominal data;
   to provide at least one vector having a set of parameters based on said training data; and
   to generate a cluster database comprising clusters associated with selected ranges of values for at least a subset of the set of parameters;
   to index the clusters of the cluster database based on an indexing distance of each of the clusters from a predetermined indexing reference point;
   to organize the clusters into a data structure of clusters based on the cluster indexing; and
   to display a relationship between at least one of the vectors and the data structure in a visually perceptible format.

9. The apparatus of claim 8, wherein said process of generating comprises:
   determining a separation distance between a test vector and one of said clusters, and
   producing a new cluster if the separation distance exceeds a threshold value.

10. The apparatus of claim 9, wherein said computer is further programmed to determine a deviation distance by dividing said separation distance between said test vector and said one or said clusters by a value representing a range of values of at least one variable in said one of said clusters, and to associate the deviation distance with a severity of a deviation of the at least one monitored-system vector from a nearest cluster.

11. The apparatus of claim 8 wherein said process of generating comprises:
   determining a separation distance between a test vector and at least one of said clusters, and
   expanding the at least one of said clusters to include the test vector when the separation distance is less than or equal to a threshold value.

12. The apparatus of claim 11, wherein said computer is further programmed to determine a deviation distance by dividing said separation distance between said test vector and said one or said clusters by a value representing a range of values of at least one variable in the at least one of said clusters, and to associate the deviation distance with a severity of a deviation of the at least one monitored-system vector from a nearest cluster.

13. An apparatus for monitoring a system, comprising a computer, having a memory storing a cluster database comprising clusters, associated with respective ranges of values for at least a subset of a set of cluster parameters, where the computer is programmed:

to provide or receive one or more monitored-system vectors having monitored-system parameter, with parameter values generated by sensors that provide data measured on a monitored system;

to determine whether the monitored-system vector is contained in any of the clusters based on at least a subset of the monitored-system parameters and the at least a subset of cluster parameters; and when at least one of the monitored-system vectors is not contained in any cluster, to determine a deviation distance of the at least one monitored-system vector from a nearest cluster, to associate the determined deviation distance with a severity of a deviation of the at least one monitored-system vector from the nearest cluster, and to display in a visually perceptible format at least one deviation distance for a parameter value for the at least one monitored-system vector from a corresponding parameter value for the nearest cluster.

14. The apparatus of claim 13, wherein said computer is further programmed;

to provide an additional database of clusters that are associated with respective ranges of values for at least a subset of said parameters, the additional cluster database being annotated with diagnostic information; and when at least one of said monitored-system vectors is not included in any of said clusters, to compare said at least one of said monitored-system vectors with the clusters of the additional cluster database.

* * * * *